(12) United States Patent
Ljung et al.

(10) Patent No.: US 8,711,776 B2
(45) Date of Patent: Apr. 29, 2014

(54) METHODS AND APPARATUS FOR ADAPTING NETWORK CHARACTERISTICS IN TELECOMMUNICATIONS SYSTEMS

(75) Inventors: Petter Ljung, Stockholm (SE); Markku Maijala, Uppsala (SE); Martin Skarve, Enebyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 212 days.

(21) Appl. No.: 13/377,027

(22) PCT Filed: Jun. 17, 2009

(86) PCT No.: PCT/SE2009/050751
§ 371 (c)(1),
(2), (4) Date: Dec. 8, 2011

(87) PCT Pub. No.: WO2010/147521
PCT Pub. Date: Dec. 23, 2010

(65) Prior Publication Data
US 2012/0093001 A1    Apr. 19, 2012

(51) Int. Cl.
*H04W 4/00* (2009.01)
(52) U.S. Cl.
USPC ............................................ 370/328; 370/252
(58) Field of Classification Search
None
See application file for complete search history.

(56) References Cited

U.S. PATENT DOCUMENTS

| | | | |
|---|---|---|---|
| 6,330,429 B1* | 12/2001 | He | 455/67.11 |
| 6,873,601 B1 | 3/2005 | Chow et al. | |
| 6,901,051 B1 | 5/2005 | Hou et al. | |
| 7,392,017 B2* | 6/2008 | Chu et al. | 455/67.11 |
| 2002/0039904 A1* | 4/2002 | Anderson | 455/456 |
| 2004/0259555 A1* | 12/2004 | Rappaport et al. | 455/446 |
| 2006/0019679 A1* | 1/2006 | Rappaport et al. | 455/456.5 |
| 2008/0247327 A1* | 10/2008 | Weil et al. | 370/252 |
| 2009/0175192 A1* | 7/2009 | Chuang et al. | 370/253 |
| 2009/0221282 A1* | 9/2009 | Lee et al. | 455/424 |
| 2010/0173631 A1* | 7/2010 | Kim et al. | 455/436 |
| 2010/0279622 A1* | 11/2010 | Shuman et al. | 455/67.11 |
| 2012/0026904 A1* | 2/2012 | Pietraski | 370/252 |
| 2013/0235752 A1* | 9/2013 | Chuang et al. | 370/252 |

FOREIGN PATENT DOCUMENTS

| | | | |
|---|---|---|---|
| WO | WO 02/11478 A1 | 2/2002 | |
| WO | WO 2008/131473 A1 | 11/2008 | |

OTHER PUBLICATIONS

International Search Report, PCT/SE2009/050751, Mar. 5, 2010.
Written Opinion of the International Searching Authority, PCT/SE2009/050751, Mar. 5, 2010.
Notification of Transmittal of International Preliminary Report on Patentability, Sep. 2, 2011.

* cited by examiner

*Primary Examiner* — Anh-Vu Ly
(74) *Attorney, Agent, or Firm* — Myers Bigel Sibley & Sajovec

(57) ABSTRACT

Methods in a network node, such as a radio base station (RBS) node or a radio network control (RNC) node, for adapting network characteristics in a telecommunications system are provided. A plurality of entities indicative of the performance of the network are measured simultaneously, by means of a single table, and one entity is selected as main entity. The measurements are stored within main entity ranges and a correlation of the measurements is performed to determine a relationship among the entities with main entity range(s). The result(s) of the correlation is used to adapt network characteristics for optimizing the network. Related network nodes are also discussed.

14 Claims, 5 Drawing Sheets

201 - User Throughput

202 - Codes used

203 - RBS Power

201 - User Throughput

202 - Codes used

203 - RBS Power

301 – UL Throughput
302 – RRR Success rate

| UL Throughput ranges | RRC success rate |
|---|---|
| 0 - 100kbps | 100% |
| 100 - 200kbps | 100% |
| 200 - 300kbps | 100% |
| 300 - 400kbps | 100% |
| 400 - 500kbps | 100% |
| 500 - 600kbps | 100% |
| 600 - 700kbps | 99.2% |
| 800 - 800kbps | 98.8% |
| …….. | …….. |

METHODS AND APPARATUS FOR ADAPTING NETWORK CHARACTERISTICS IN TELECOMMUNICATIONS SYSTEMS

CROSS-REFERENCE TO RELATED APPLICATION

This application is a 35 U.S.C. §371 national stage application of PCT International Application No. PCT/SE2009/050751, filed on Jun. 17, 2009, the disclosure and content of which is incorporated by reference herein as if set forth in its entirety. The above-referenced PCT International Application was published in the English language as International Publication No. WO 2010/147521 on Dec. 23, 2010.

FIELD

The embodiments of the present invention relate generally to the field of performance monitoring in a telecommunications system, and, more particularly, to a method and network node for adapting network characteristics based on measurements performed in the network.

BACKGROUND

Generally, network nodes or network elements such as radio base stations (RBSs), radio network control nodes (RNCs) or core network nodes, regularly conduct measurements of entities indicative of the performance in the network and collect these entities and related statistics by means of performance monitoring counters. As an example, a counter can be used to collect data representing the number of dropped calls; another counter can be used to collect data representing a number of rejected calls; another counter can be used to collect data representing a number of performed handovers; another counter can be used to collect data representing statistics on the radio resource control (RRC) success rate; and a further counter can be used to collect data representing statistics on the throughput (uplink or downlink throughput) in a cell. The data from each counter is usually stored separately in a database or a register either as the average over a certain time or as a probability density function, based on the periodic sampling of the measured data (or entity). The stored data can be subsequently analysed by a network operator to verify the configuration of the network. The number of databases may also increase with the number of counters. Furthermore, the databases have little or no communication between them. This makes it hard for the operator to manage the network performance. For example, network operators would currently have difficulty associating a sudden drop of the RRC success rate with a change in uplink or downlink throughput that caused it. This also means that it is currently difficult to adequately reconfigure or adapt network characteristics to e.g. balance the load in the network or to dimension network resources etc.

Consequently, there is a need for an improved solution which simplifies for the network operator to associate a plurality of measured entities indicative of the performance of the network in order for the operator to adapt/optimize it network.

SUMMARY

It is thus an object of the exemplary embodiments of the present invention to address the above mentioned problems and to provide a method and a network node, that allow effective and reliable analysis of measured entities in order to optimize performance of a network.

According to an aspect of embodiments of the present invention, the above stated problem is solved by means of a method for use in a network node, for adapting network characteristics in a telecommunications network system comprising a plurality of radio base stations and user equipments served by one or several radio base stations. The method comprises: simultaneously measuring, by means of a single counter, a plurality of entities indicative of the performance in the network, during a predetermined time period; storing the measured entities within predefined ranges, each predefined range is related to an entity; correlating the measured entities to determine a relationship among entities within a predefined range and adapt the network characteristics based on the result of the correlation.

Thus, instead of using a plurality of distinct counters, each one focusing at one entity, a single counter is provided that measures a plurality of entities simultaneously and during predetermined time interval(s) (e.g. 15 minutes or 1 hour etc.). One entity is selected as the main entity and is used for defining ranges i.e. defining main entity ranges. The other measured entities are stored per entity for each main entity range. A correlation of the measured entities is performed to determine a relationship/association among entities within a main entity range and the result of the correlation is used to adapt the network characteristics.

According to another aspect of embodiments of the present invention, the above stated problem is solved by means of a network node for adapting network characteristics in a telecommunications network system comprising a plurality of radio base station and user equipments. The network node comprises measuring means that is configured to measure, by means of a single counter, a plurality of entities indicative of the performance in the network, during a predetermined time period. The network node further comprises storage means (e.g. a database) configured to store the measured entities within predefined ranges, each predefined range is related to an entity. The network node also comprises correlating means (i.e. a correlator) configured to correlate the measured entities to determine a relationship among entities within a predefined range. The network node further comprises processing means configured to adapt the network characteristics based on the result of the correlation performed by the correlating means.

An advantage with embodiments of the present invention is that a single counter is used for simultaneously measuring and combining several and different measurement entities.

Another advantage with embodiments of the present invention is to allow a structured and straight-forward correlation of various entities, which provide valuable information for optimizing the network.

Still other objects and features of the embodiments of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the exemplary embodiments of the present invention. However, it will be apparent the description below that the exemplary embodiments of the present invention may be practiced in other embodiments that depart from these specific details.

The different embodiments of the present invention can be implemented in any telecommunications network system wherein entities indicative of the performance of the network can be measured and collected for optimizing the network. As an example, the embodiments of the present invention can be implemented in LTE system and/or in HSPA (high speed packet access) and/or in HSDPA (high speed downlink packet access) and/or in HSUPA (high speed uplink packet access) and/or in a UMTS and/or in GSM and/or in WiMaX (worldwide interoperability for microwave access) and/or in CDMA-2000 and/or in wireline and/or in or optical communications systems etc.

Figure 1:
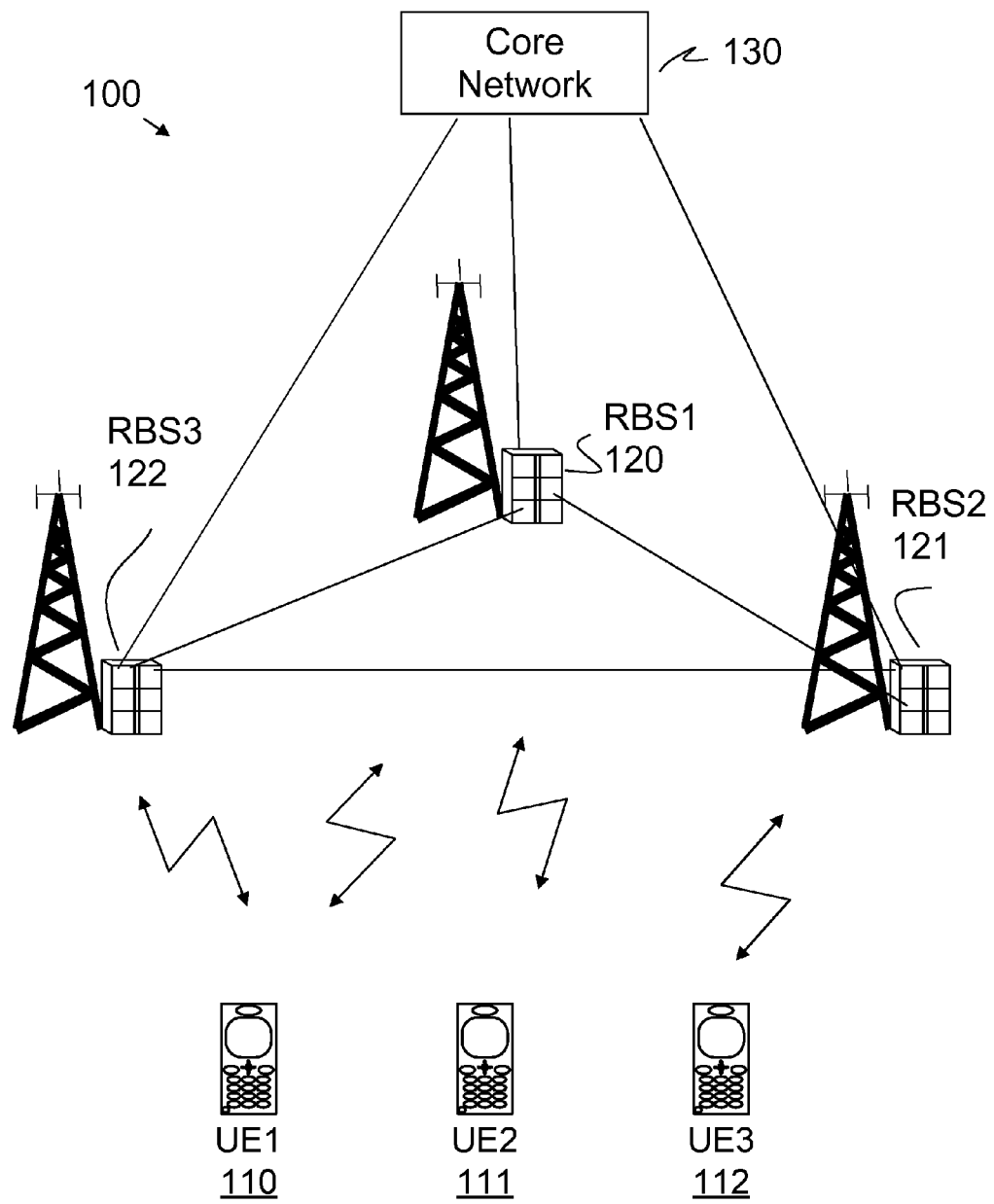
FIG. 1 a diagram illustrating an example of a wireless network telecommunications system wherein exemplary embodiments of the present invention can be applied.

Referring to FIG. 1, there is illustrated a block diagram of an exemplary wireless telecommunications network system 100 in which the different exemplary embodiment of the present invention may be applied. Note that the system depicted in FIG. 1 only shows transceivers or apparatus or network nodes for understanding the different exemplary embodiments of the present invention. As shown, the system 100, comprises a number of apparatuses acting as user equipments UE1 110, UE2 111, UE3 112, and apparatuses acting as radio base stations (RBS) and denoted RBS1 120, RBS2, 121 and RBS3 122. Traffic, over a radio link, from a RBS to a UE is referred to as downlink (DL) traffic and traffic, over a radio link, from the UE to a RBS is referred to as uplink (UL) traffic. A core network 130 is also illustrated. Note that in FIG. 1, the number of UEs and RBSs is only illustrative and the embodiments of the present invention are not restricted to any particular number of UEs and/or number of RBSs and/or number of cells per RBSs.

It should be mentioned that in some systems like GSM, UMTS and HSPA, a radio network controller is used to control traffic to and from UEs; whereas in other systems like LTE, no RNC is present, instead the radio base station (denoted eNodeB or eNB in LTE) is responsible in controlling the traffic between UEs and the eNodeB.

In addition, the network node that is responsible in collecting entities indicative of the performance in the network also differs depending on which access technology is used. As an example, in GSM, UMTS and HSPA, the RBS and/or the RNC can monitor the performance in the network whereas in LTE, it is the eNodeB that is responsible in monitoring the performance in the network.

In the following, the node that is responsible in monitoring and collecting entities indicative of the performance in the network is denoted a network node. This node can be a RBS, a RNC, a eNodeB or any suitable network node/element. The exemplary embodiments of the present invention are therefore not restricted to any particular access technology.

According to an exemplary embodiment of the present invention, a network node is provided with a measuring means including a single counter. By means of the single counter a plurality of entities indicative of the performance of the network, are measured simultaneously over a predetermined time period. The measured entities are stored in storage means (e.g. a database), within predefined ranges wherein each range is related to an entity which can be defined as a main entity. Thereafter, a correlation is performed to correlate between the measured entities to determine a relationship among the entities within a predefined range. The correlation operation is performed by correlating means (i.e. a correlator) provided in the network node. The result of the correlation is then used to adapt network characteristics in order to optimize the network. The adaptation of the network characteristics are performed by means of e.g. processing means of the network node.

As an example, assuming that the type of entities that are measured, by means of the single counter, include: the throughput in the network; the code rates that are used in the network; the RBS output power; the TTIs (transmission time interval), the session time, etc. Among the different entities, one entity is selected as the main entity which in this example is represented by the throughput, and which is used to define a plurality of throughput ranges e.g. Range 1 (0-100 kbps); Range 2 (100-200 kbps); Range 3 (200-300 kbps) etc. The other entities are measured simultaneously and the results from each measurement are stored per entity for each main entity range (i.e. for each throughput range). The throughput is also measured. The result (or the counter) can be visualized as a table. This is illustrated in table 1 below.

TABLE 1

| throughput | Average Codes used | Average RBS power | Average TTIs used | Average Session time |
|---|---|---|---|---|
| Range 1 = 0-100 kbps | 1.2 | 2 | 105 | 1.1 |
| Range 2 = 100-200 kbps | 2.4 | 4 | 140 | 1.6 |
| Range 3 = 200-300 kbps | 2.6 | 4.3 | 144 | 5.6 |
| ... | ... | ... | ... | ... |

As shown in table 1, the stored result from the entities represents an average. However a sum, peak, minimum, a median, a percentage etc can instead be stored.

Using the stored information, correlation of the measured entities can be performed in order to determine a relationship between the measured entities within a range. As an example, it is possible to determine how much RBS power is consumed and what codes are used for a certain throughput in a certain throughput range. This enables the network operator to adjust e.g. the RBS power or to change the codes to be used in order to achieve a certain throughput. Thus by correlating the measured entities, it is possible to determine, for a certain value of an entity in a predefined range (e.g. for a given throughput in a predefined throughput range), at least one corresponding value of another entity (e.g. the RBS power and/or the code (s)) that is stored within the predefined range. It should be mentioned that the exemplary embodiment of the present invention is not restricted to any particular number of entities.

Figure 2:
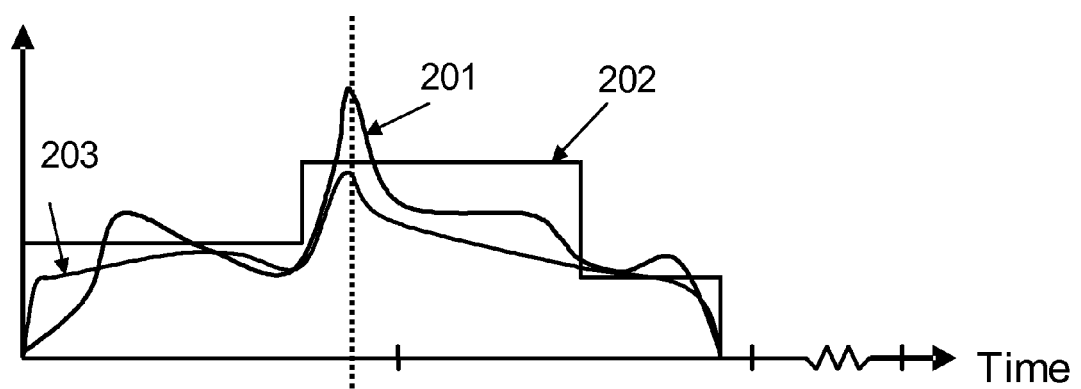
FIG. 2 is a diagram illustrating counter measurements of different types of entities indicative of the performance in the network in accordance with an exemplary embodiment of the present invention.

Referring to FIG. 2, there is illustrated a diagram comprising three curves representing measurements of different entities indicative of the performance in the network. The measurements are performed simultaneously by means of the single counter. The measurements are performed during a predetermined time period equal to 1 hour. As shown:

Curve (201) represents user throughput measurements i.e. the UL throughputs perceived by UEs during one 1 hour.

Curve (202) represents the codes that are used during the same hour; and

Curve (203) represents the RBS power consumption during said hour.

It should be noted that the measurement results shown in FIG. 2 can be visualized by means of a table as in the previously described table 1.

In the above example, the throughput has been sampled and stored within predefined ranges (e.g. 0-100 kbps; 100-200 kbps; 200-300 kbps) and the user throughput, the codes and the RBS power have been measured, by means of the single counter. This way a correlation of the measurement entities (i.e. user throughput, codes used and RBS power) can be performed. As an example (see dashed line in FIG. 2), it is possible to determine for the highest throughput which code has been used and which RBS power has been consumed. The result of the correlation between the measured entities can also be used to dimension the network resources and/or to balance the load in the cell served by the RBS. As an example, a user may utilize all resources in a cell. The cell is however not considered under-dimensioned as it is rather dimensioned for a minimum acceptable user throughput. The result of the correlation may then provide information if more resources (e.g. by tuning admission levels or by adding codes, power, carriers etc) shall be added to achieve a minimum acceptable user throughput for all users (or a group of users) in the cell.

Figures 3A, 3B:
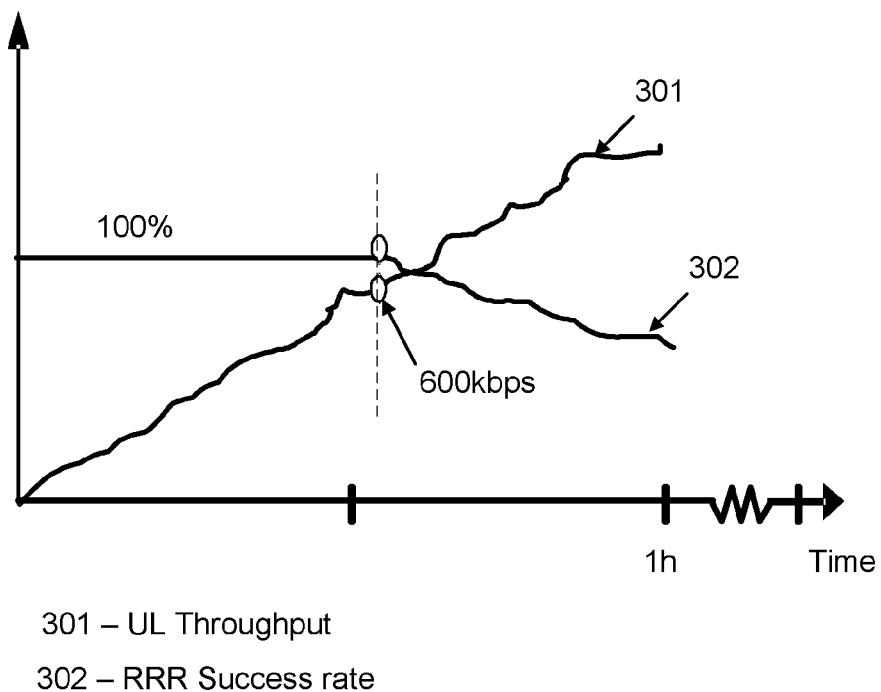
FIG. 3A is another diagram illustrating counter measurements of different types of entities indicative of the performance in the network in accordance with exemplary embodiments of the present invention.
FIG. 3B is table comprising counter measurements of FIG. 3A.

Referring to FIG. 3A there is illustrated another diagram comprising two measurement curves representing measurements of two types of entities which are indicative of the performance in the network. These are the user throughput and the RRC success rate which are monitored during 1 hour. The measurements are performed simultaneously by means of the single counter in accordance with an embodiment of the present invention. These measurements (UL throughput and RRC success rate) are stored within predefined throughput ranges i.e. the main entity indicative of the performance in the network is here considered to be the UL throughput. A correlation is then performed to determine a relationship among the UL throughput and the RRC success rate. Based on the result of the correlation, characteristics of the network (e.g. resource levels etc.) can be adapted to optimize the network. It should be noted that a RRC success rate indicates how many RRC procedures that have been completed successfully and how many that have failed. As shown in FIG. 3A:

Curve (301) represents the UL throughput measurements during one 1 hour.

Curve (302) represents the monitored RRC success rate during 1 hour.

The measurements performed by the single counter are also visualized in a table (see FIG. 3B below) in the form of measurement levels.

In FIG. 3A-3B, the result of the correlation of the UL throughput and the RRC success rate entities shows that the RRC success rate (or the average RRC success rate) is 100% in all throughput ranges before 600-700 kbps. But when the throughput exceeds 600 kbps, the RRC success rate starts to degrade successively (99.2%, 98.8% etc.) even though the throughput continues to increase. This information (i.e. the result of the correlation) is valuable since it enables an operator to adapt the network characteristics in order to dimension the network or to balance the load in a cell or to perform troubleshooting in the network or to tune one or several network resources etc.

It should be mentioned that the embodiments of the present invention are not restricted to the above described entities.

As an example, the following entities can be measured by the single counter implemented in an eNB of a LTE system:

CQI (Channel Quality Index)

Number of resource blocks

Number of transfers.

As main entity, the throughput can be used. This means that the predefined ranges correspond to throughput ranges. After measurements have been performed and after storing of said measurements, a correlation of measured entities is done to determine a relationship among entities within the predefined ranges. The operator may use the result of the correlation to determine e.g. what CQI is needed to achieve a certain throughput (e.g. minimum acceptable rate). The operator may also determine to what level CQI is limiting the throughput and need to be improved in order to adjust cell plan. The operator may also determine the number of resource blocks required to achieve a certain throughput (e.g. minimum acceptable rate) and to what level the number of resource blocks is limiting the throughput and needs to be extended (i.e. by adding more spectrum).

In another example, the following entities can be measured by the single counter implemented in a RBS of a HSPA network:

Rise over Thermal (RoT) which indicates the ratio between the total power received from wireless sources at a RBS and the thermal noise.

System releases (Drops) due to UL synchronization (sync) problems (i.e. dropped connections due to sync problems).

As a main entity, the RoT is selected and RoT ranges can be defined. Measurements are performed during e.g. 1 hour and stored. Each RoT range will thus include a drop rate value (or number of drops). A correlation is then performed to determine a relationship among the RoT and the Drops. As an example, the result of the correlation can give information about what RoT level to dimension in order to limit the drop rate to an acceptable level. This level can e.g. be tuned to achieve a desired RoT level and to limit the drop rate. As an example, it can be concluded from the correlation result that the maximum allowed RoT level in a cell needs to not exceed 12 dB in order to limit the drop rate to an acceptable level.

Other examples of adaptation of network characteristics based on a result of a correlation of entities indicative of the performance of the network may include the following:

Reserving capacity (power and/or codes) for e.g. HSDPA in order to prioritize HSDPA users that have used the radio resources more efficiently than Release 99 (R99) PS (packet-switched).

Changing the mobility behavior as how compressed mode is triggered; how many cells needs to be included in an active set of cells; when to start to send speech call to GSM in a congestion situation due to performance degradation or due to capacity reasons.

Configuring QoS (Quality-of-Service) functionality to prioritize between users or to limit their throughput in order to get more capacity.

Tuning channel switching parameters to affect the number of users per state (capacity) and their performance.

The examples above are not exhaustive and the exemplary embodiments of the present invention are not restricted to any particular adaptation scheme.

Figure 4:
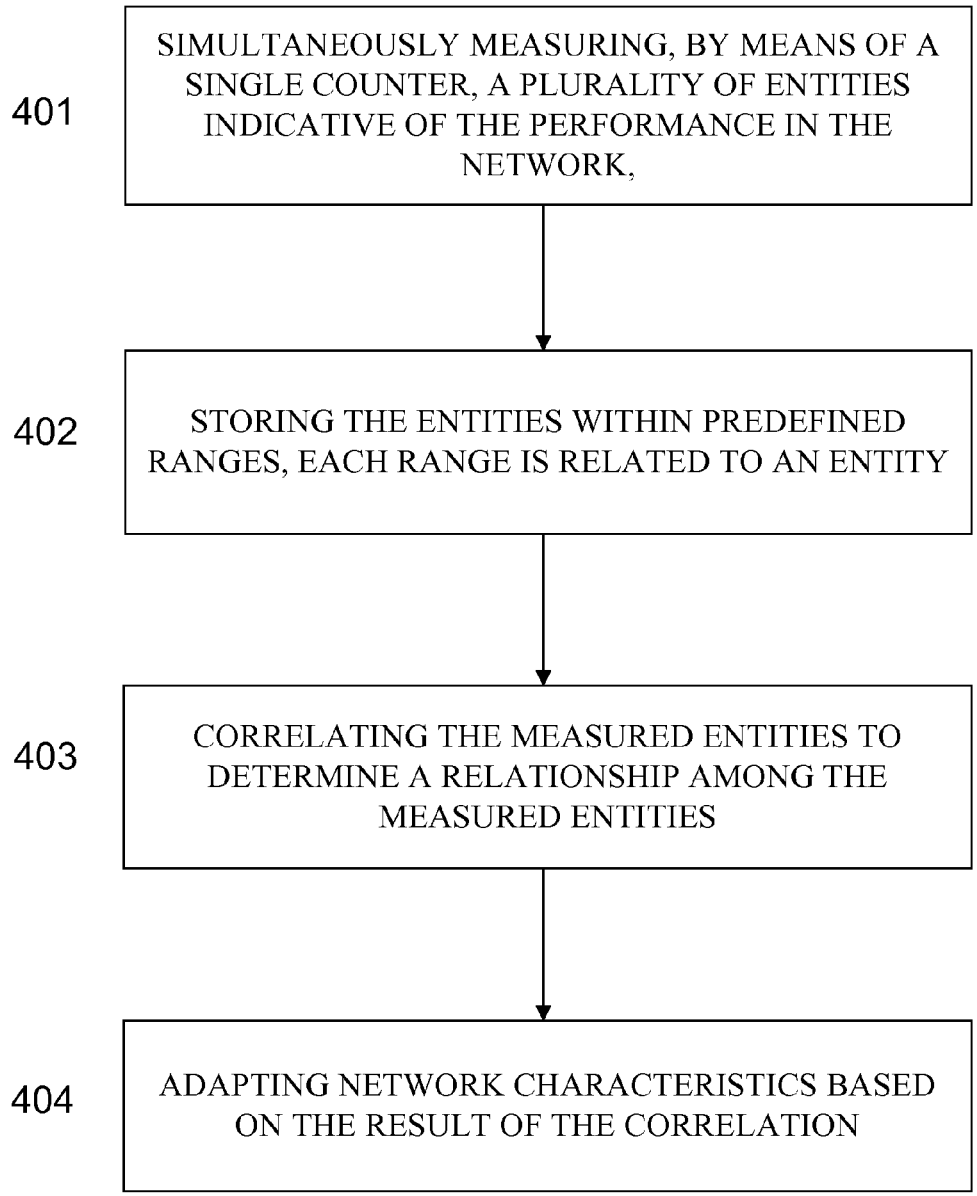
FIG. 4 is a diagram illustrating a flowchart of a method according to exemplary embodiments of the present invention.

Referring to FIG. 4, there is illustrated a flowchart of a method, performed in a network node (e.g. RBS, eNodeB; RNC etc.) for adapting network characteristic according to the previously described exemplary embodiments of the present invention. As shown in FIG. 3, the main steps of the method comprise:

(401) simultaneously measuring, by means of a single counter, a plurality of entities indicative of the performance in the network, during a predetermined time period;

(402) storing the measured entities within predefined ranges, each range is related to an entity (i.e. a main entity)

(403) correlating the measured entities to determine a relationship among the measured entities within a predefined range; and (404) adapting network characteristics based on the result of the correlation.

Example of network characteristics and examples of how adaptation of said characteristics have already been described and are therefore not repeated.

It should be mentioned that initiation of the measuring of the plurality of entities can be based on a request received from another network node or from one or more UEs.

It should also be mentioned that the use of a single counter allows a compact way of storing correlation information (or correlation results) and measurement entities. This means that separate storage means, one for each entity, are not needed. This also means that the analysis of the correlation information can be done faster compared to that if a plurality of counters are used.

Figure 5:
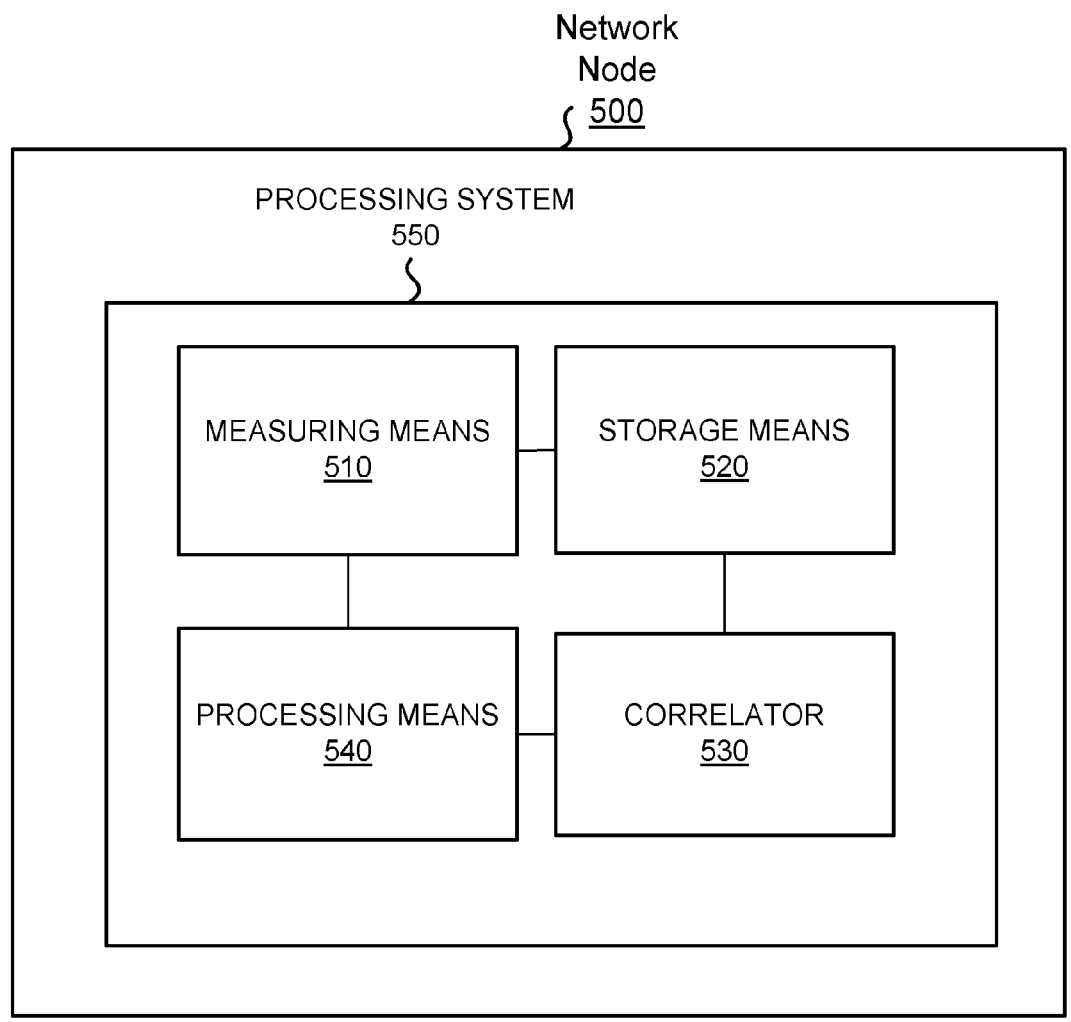
FIG. 5 illustrates a block diagram of an exemplary network node according to exemplary embodiments of the present invention.

Referring to FIG. 5 there is illustrated a block diagram of an exemplary network node 500 (e.g. eNodeB or a RBS or a RNC or any suitable network node) for adapting network characteristics in a telecommunications network system. As shown in FIG. 5, the network node 500 comprises measuring means 510 that includes a single counter (not shown) by means of which a plurality of entities indicative of the performance of the network are measured simultaneously during predetermined time period(s). The network node 500 further comprises storage means 520 (e.g. a database) configured to store the measured entities within predefined ranges, each range related to an entity. The network node 500 also includes correlating means 530 (i.e. a correlator) that is configured to correlated the stored entities in order to determine a relationship among entities with a predefined range. The network node 500 further comprises processing means 540 arrange to adapt the network characteristics based on the result of the correlation. The operations of the measuring means, the storage means, the correlating means and the processing means have previously been described and are therefore not repeated here. Note that the different exemplary means shown in FIG. 5 are not necessarily separated. Furthermore, the different means may be interconnected to each other. These means may be part of a processing system 550, however this is not necessary. The network node 500 may also comprise other means/units which are not depicted in FIG. 5. Examples of an additional means/unit that can be part of the network node is a transmitter unit that is configured to transmit signals to other nodes or user equipments in the network. As an example, the network node 500 may transmit the result of the correlations to e.g. a operation subsystem (OSS). The network node 500 further comprises a receiver unit configured to receive signals from network node(s) or user equipments. As an example, the network node 500 receives a request from another network node or from one or several user equipments, to initiate the measuring of the plurality of entities representing resource levels and/or entities related to the network characteristics. The network node 500 may also comprise integrated circuits and discrete components which are known by a person skilled in the art.

The embodiments of the present invention can be realised in many ways. As an example, processors in associations with software and hardware means may be used to implement the method claims related to the network node. For example, one embodiment of the present invention includes a computer-readable medium having instructions stored thereon that are executable by the network node. The instructions when executed perform the method steps as set forth in the claims.

Furthermore, the exemplary embodiments of the present invention may be implemented in any type of communications system. By way of example, the exemplary embodiments of the present invention may be implemented in a non-limiting general context in relation to network node pertaining to LTE and/or UMTS and/or WiMAX and/or HSPA and/or HSDPA (high speed downlink packet access) and/or HSUPA, GSM, CDMA-2000, wireline or optical communications systems.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the embodiments of the present invention.

The invention claimed is:

1. A method for adapting network characteristics in a telecommunications network system comprising a radio base station capable of serving a plurality of user equipments, the method comprising:

simultaneously measuring in a network node, by means of a single table, a plurality of entities indicative of performance in a network during a predetermined time period;

selecting one of the measured plurality of entities as a main entity and using the main entity to define a plurality of main entity ranges;

storing the remaining ones of the plurality of measured entities within the main entity ranges, per entity;

correlating the plurality of measured entities to determine to relationship among entities within a main entity range to provide a correlation result; and adapting network characteristics based on the correlation result wherein the network node is one of a radio base station node or a radio network control node.

2. The method of claim 1, wherein correlating comprises, for a certain value of an entity in a main entity range, determining at least one corresponding value of another entity stored within the main entity range.

3. The method of claim 1, wherein adapting comprises dimensioning the network characteristics based on the correlation result.

4. The method of claim 1, wherein adapting further comprises dimensioning the network characteristics corresponding to network resources based on the correlation result.

5. The method of claim 2, wherein adapting comprises balancing a load in at least a cell served by the radio base station based on the correlation result.

6. The method of claim 1 further comprising initiating the measuring of the plurality of entities based on a request received from a network node or from at least one user equipment.

7. The method of claim 1, wherein the measured plurality of entities represent resource levels and/or entities related to the network characteristics.

8. A network node for adapting network characteristics in a telecommunications network system comprising a radio base station capable of serving a plurality of user equipments, the network node being one of a radio base station node or a radio network control node, the network node comprising:

measuring means configured to simultaneously measure, by means of a single table, a plurality of entities indicative of performance in a network, during a predetermined time period, and for selecting one of the measured plurality of entities as a main entity, and using the main entity to define a plurality of main entity ranges;

storage means configured to store the remaining ones of the plurality of measured entities per entity within the main entity ranges;

a correlator configured to correlate the plurality of measured entities to determine a relationship among entities within a main entity range to provide a correlation result; and processing means configured to adapt the network characteristics based on the correlation result.

9. The network node of claim 8, wherein the correlator is further configured, for a certain value of an entity in a main entity range, to determine at least one corresponding value of another entity stored within the main entity range.

10. The network node of claim 8, wherein the processing means is configured to dimension the network characteristics based on the correlation result.

11. The network node of claim 8, wherein the processing means is further configured to dimension the network characteristics corresponding to network based on the correlation result.

12. The network node of claim 9, wherein the processing means is further configured to balance a load in at least a cell served by the radio base station based on the correlation result.

13. The network node of claim 8, wherein the measuring means is further configured to initiate the measuring of the plurality of entities based on a request received from a network node or from at least one user equipment.

14. The network node of claim 8, wherein the plurality of measured entities represent resource levels and/or entities related to the network characteristics.

* * * * *

UNITED STATES PATENT AND TRADEMARK OFFICE
CERTIFICATE OF CORRECTION

| | | |
|---|---|---|
| PATENT NO. | : 8,711,776 B2 | Page 1 of 1 |
| APPLICATION NO. | : 13/377027 | |
| DATED | : April 29, 2014 | |
| INVENTOR(S) | : Ljung et al. | |

It is certified that error appears in the above-identified patent and that said Letters Patent is hereby corrected as shown below:

In the Claims

In Column 8, Line 46, in Claim 1, delete "to relationship" and insert -- a relationship --, therefor.

Signed and Sealed this
Ninth Day of September, 2014

Michelle K. Lee
*Deputy Director of the United States Patent and Trademark Office*